(12) United States Patent
Filep

(10) Patent No.: US 7,158,867 B2
(45) Date of Patent: Jan. 2, 2007

(54) COMPUTERIZED SIMULTANEOUS LASER MARKING AND TARGETING SYSTEM

(75) Inventor: Zoltan Filep, Turlock, CA (US)

(73) Assignee: Filep Zoltan, Turlock, CA (US)

(*) Notice: Subject to any disclaimer, the term of this patent is extended or adjusted under 35 U.S.C. 154(b) by 0 days.

(21) Appl. No.: 10/996,907

(22) Filed: Nov. 23, 2004

(65) Prior Publication Data

US 2005/0126019 A1   Jun. 16, 2005

Related U.S. Application Data

(60) Provisional application No. 60/525,809, filed on Nov. 28, 2003.

(51) Int. Cl.
*G01D 1/00* (2006.01)
(52) U.S. Cl. .......................... 701/23; 701/28
(58) Field of Classification Search ................ 33/18.1
See application file for complete search history.

(56) References Cited

U.S. PATENT DOCUMENTS

| | | | | | |
|---|---|---|---|---|---|
| 4,333,008 | A | * | 6/1982 | Misek ......................... | 250/225 |
| 4,773,018 | A | * | 9/1988 | Lundstrom ................... | 701/200 |
| 4,790,402 | A | * | 12/1988 | Field et al. .................. | 180/169 |
| 4,855,915 | A | * | 8/1989 | Dallaire ....................... | 701/23 |
| 6,265,704 | B1 | * | 7/2001 | Livingston ............... | 250/203.2 |
| 6,275,773 | B1 | * | 8/2001 | Lemelson et al. .......... | 701/301 |
| 6,370,475 | B1 | * | 4/2002 | Breed et al. ................ | 701/301 |
| 6,629,028 | B1 | * | 9/2003 | Paromtchik et al. .......... | 701/23 |
| 6,809,307 | B1 | * | 10/2004 | Byren et al. ............. | 250/201.9 |
| 6,944,365 | B1 | * | 9/2005 | Miller et al. .................. | 385/18 |

* cited by examiner

*Primary Examiner*—Christopher W. Fulton
(74) *Attorney, Agent, or Firm*—James E. Eakin

(57) ABSTRACT

A novel method and system is provided for simultaneous, non-invasive and non-contact marking for processing of targeted objects. The viewing, selection, marking, processing and feed-back is substantially simultaneous and computerized.

2 Claims, 5 Drawing Sheets

COMPUTERIZED SIMULTANEOUS LASER MARKING AND TARGETING SYSTEM

CITATION OF PROVISIONAL APPLICATION

This application for U.S. patent is a non-provisional conversion of U.S. provisional application for patent Ser. No. 60/525,809 filed on Nov. 28, 2003, and claims the benefit thereof.

BACKGROUND OF THE INVENTION

Marking is an important component in the processing of objects. Marking is actually communicating information and decisions to the processing units. Even for a temporary marking, like for a processing phase, labeling and scanning has been used. The method is restrictive, because the object has to be oriented all the time towards the scanners, otherwise the labels cannot be read. After a certain processing phase, the label may become obsolete, creating confusion. It needs additional equipment and time in the processing flow for this type of marking. Handling of large size of objects makes the classical method of marking also too slow.

Labels can be read one at a time, slowing down the parallel processing.

There are other fields, like in the military, where marking is also important-identifying the difference between target and neutral or even friendly objects-but labeling is impossible. Classical laser targeting is sequential, one object after the other, where the targeting has to follow the target until processing completes, making parallel processing impossible.

Thus there is a need for parallel processing, for a higher efficiency, and preferably for a substantially simultaneous marking.

SUMMARY OF THE INVENTION

The invention is directed to increasing the efficiency of existing laser marking and targeting systems, and helps also in decision making and process control.

The simultaneous laser marking/targeting system (SLTS) scans the field and simultaneously targets multiple objects—indifferent to their physical orientation, subjects to future processing—with a coded laser, such that each object receives and reflects specific information. The reflected information is read and used by one or more processing units to locate, to select, to approach and to process in substantially the same time the selected objects.

The marking and targeting system is controlled by at least one computer. A human operator can select the targets thru a human-machine interface (HMI), 'by mouse-click', for example. The presence of a human operator is optional. Decision making can be aided by image recognition software working together with at least one database. This can reduce the risk of human error, thus avoiding erroneous processing that can result in friendly fire or civilian casualties.

The differences from the classical "point at the target" procedure to the simultaneous targeting of the present invention is similar to the difference between the sequential search of information on magnetic bands to the direct memory access on hard-drives, the advantages are undeniable.

DETAILED DESCRIPTION OF THE INVENTION

Figure 1:
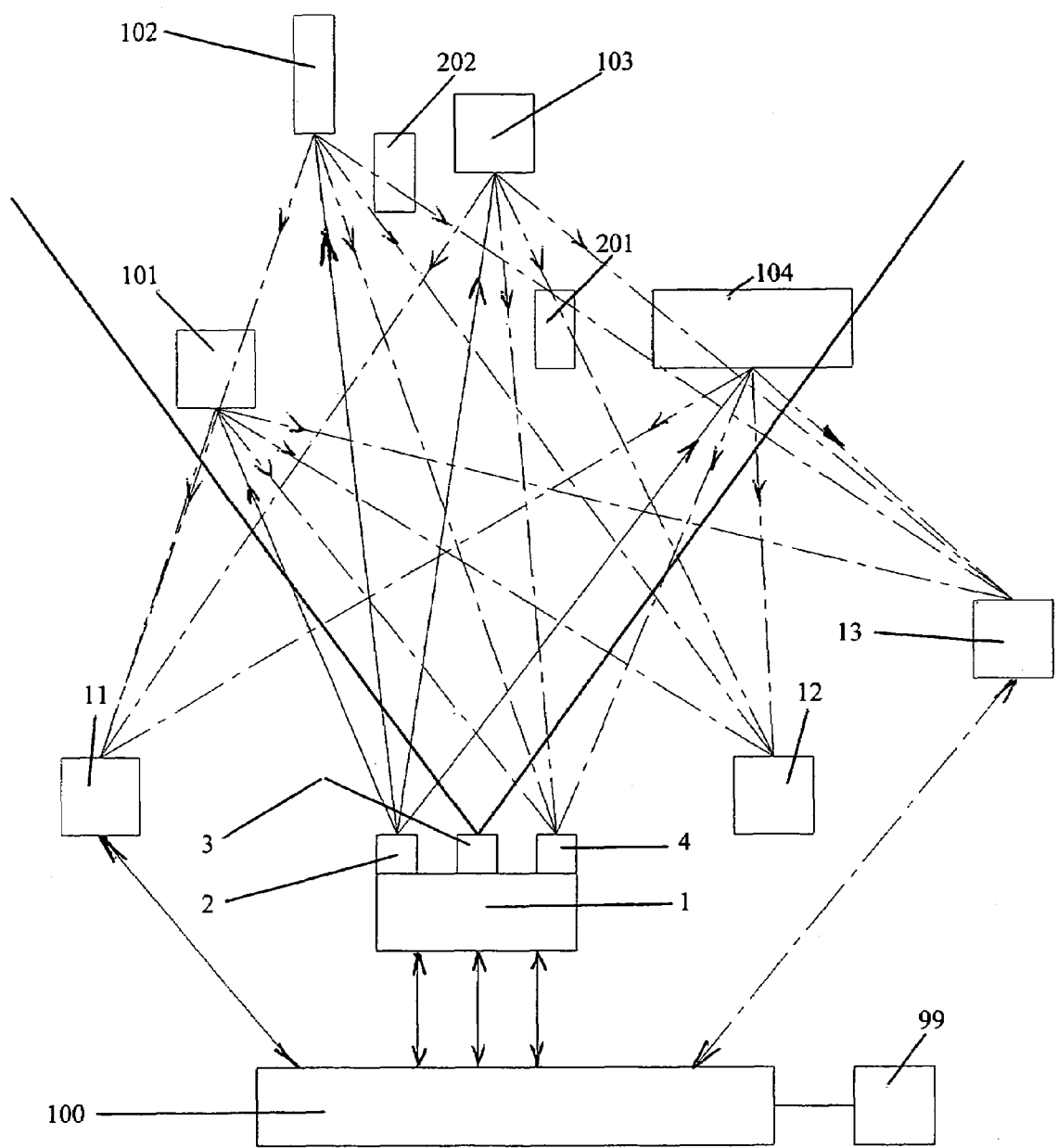
FIG. 1 is a general view of the application of the invention.

In all drawings:
1 Simultaneous Laser Targeting equipment (SLT)
2 Simultaneous Laser Targeting Unit (SLTU)
3 Video Camera (VC)
4 Laser Control Camera (LCC)
11, 12, 13—Processing Units (PU)
101, 102, 103, 104—Target Objects (TO)
201, 202—Neutral Objects (NO)
100—Computer
99—Human Machine Interface (HMI)
501—SLTU Controller
511—Laser
512—Laser Control Unit
521—Rotating Mirror
522—Horizontal Servo Motor
523—Vertical Servo Motor
601, 602, 603, 604—Guiding Sensors
605—Selector Sensor FIG. 1 is a general view of the application of the invention as a targeting system.

From a multitude of objects, 101—104 are selected as target. The rest of the objects—201 and 202—are considered neutral and are not targeted.

Targeting is executed by 1, the SLT.

The simultaneous laser targeting equipment 1 (SLT) has as components the simultaneous laser targeting unit 2 (SLTU), the video camera 3 (VC) and the laser control camera 4 (LCC).

The video camera 3 (VC) observes the field and delivers the input to the system. The information given by video camera 3 is processed by computer 100—a computer with image recognition software and at least one database, or a human operator 99, to select the targets and the procedure to apply to each selected target.

The targets are marked by the simultaneous laser targeting unit 2 (SLTU) and discrete information is sent via the laser to each target. The laser control camera 4 reads the reflected targeting information, and helps to make adjustments and corrections if necessary. It may be thought of as closing the control loop for targeting.

The reflected laser beam's coded information is read by the processing units 11, 12 and 13. These units can be simply pre-programmed, like processing unit 12, or they can communicate with computer 100 or other computers, either hard-wired like 11 or wireless like 13. Processing units having a SMART-type of guiding system can use the reflected signals as a beacon, selecting their own targets and applying the required processing to them, in accordance with the laser beam's decoded information and controls.

Figure 2:
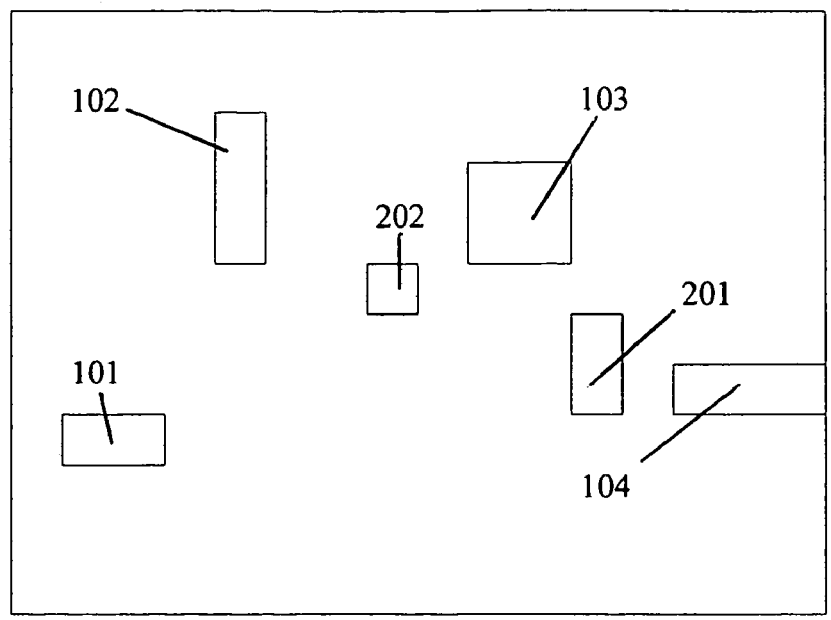
FIG. 2 is an image of the processing area, with subjects to be precessed and neutral objects.

FIG. 2 is an image of the processing area with the marked objects 101, 102, 103, 104 and the neutral objects 201, 202. It is the image captured by the video camera 3, the input for the targeting system.

Figure 3:
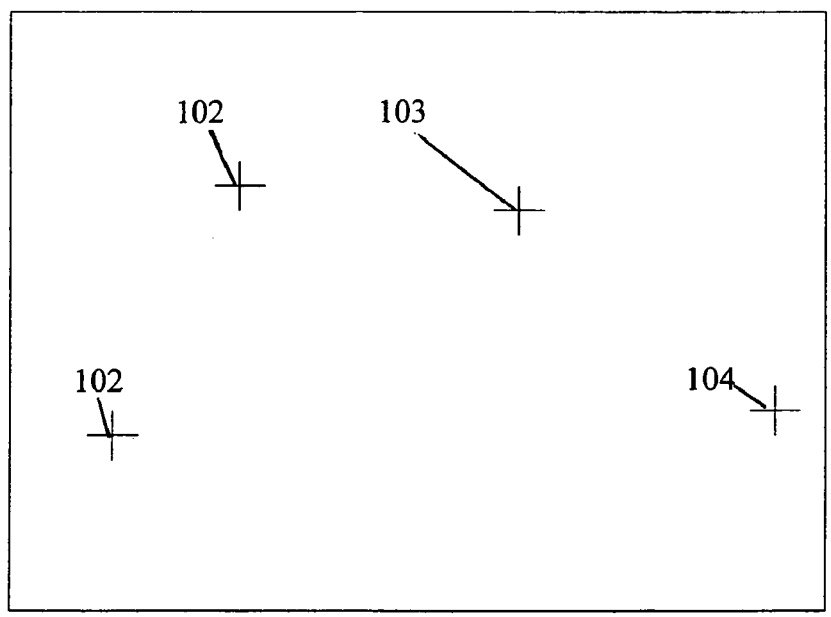
FIG. 3 is an image of the laser control camera, with multiple applied marks/labels.

FIG. 3 is the image captured by the laser control camera 4, the actual feed-back.

Figure 4:
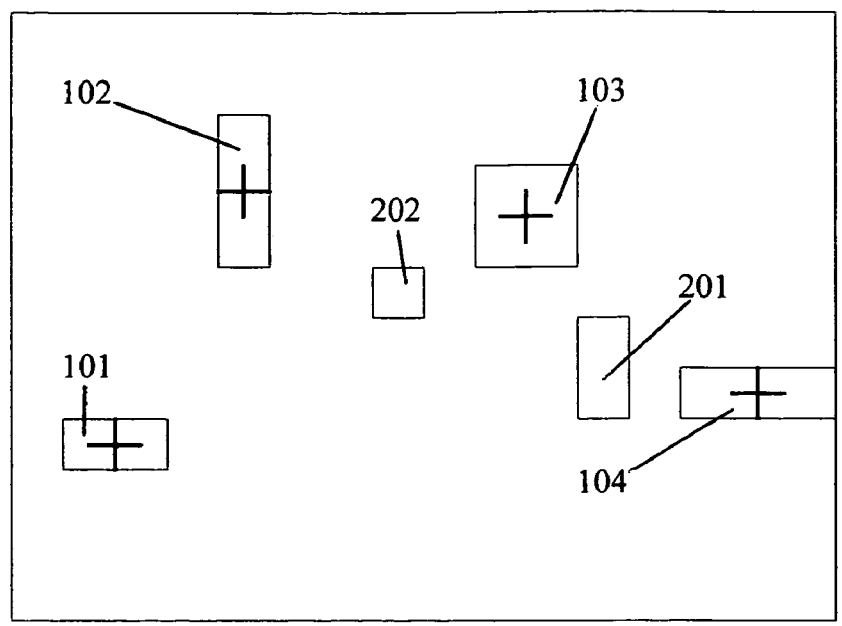
FIG. 4 is a combined picture of FIG. 2 and FIG. 3, showing the marked/targeted objects and the neutral objects together. This is the image displayed on the HMI.

FIG. 4 is the combined image of the VC 3 and LCC 4, as actually displayed on the HMI display 99. This is what the human operator sees on his display.

Figure 5:
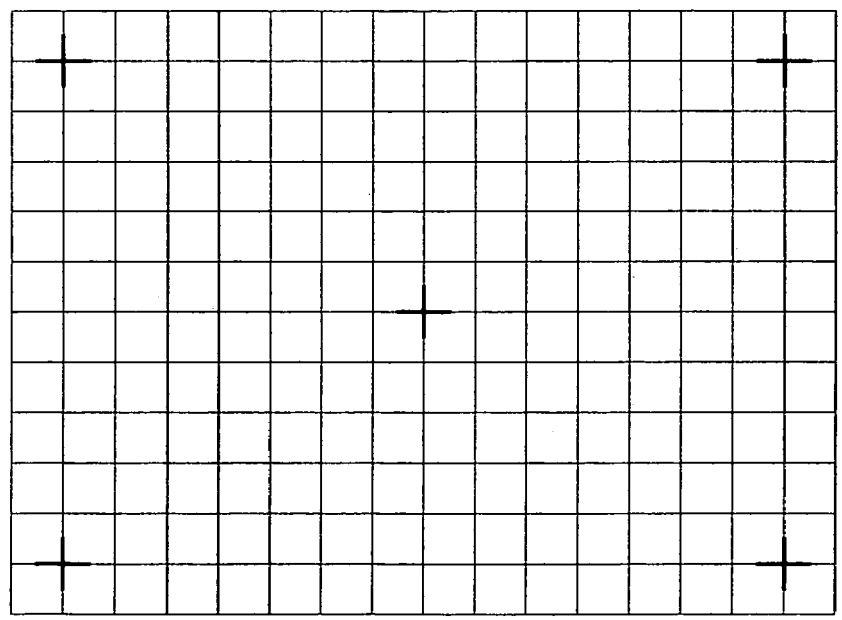
FIG. 5 is a calibration raster for the SLTS.

FIG. 5 is a calibration raster to align the SLTU, VC and LCC. The idea is similar to the aligning of touch-screens. Corrections are made in the controls, until the 4 corners and the center of all 3 images—video 3, marking 2 and feed-back 4—are perfectly aligned.

Figure 6:
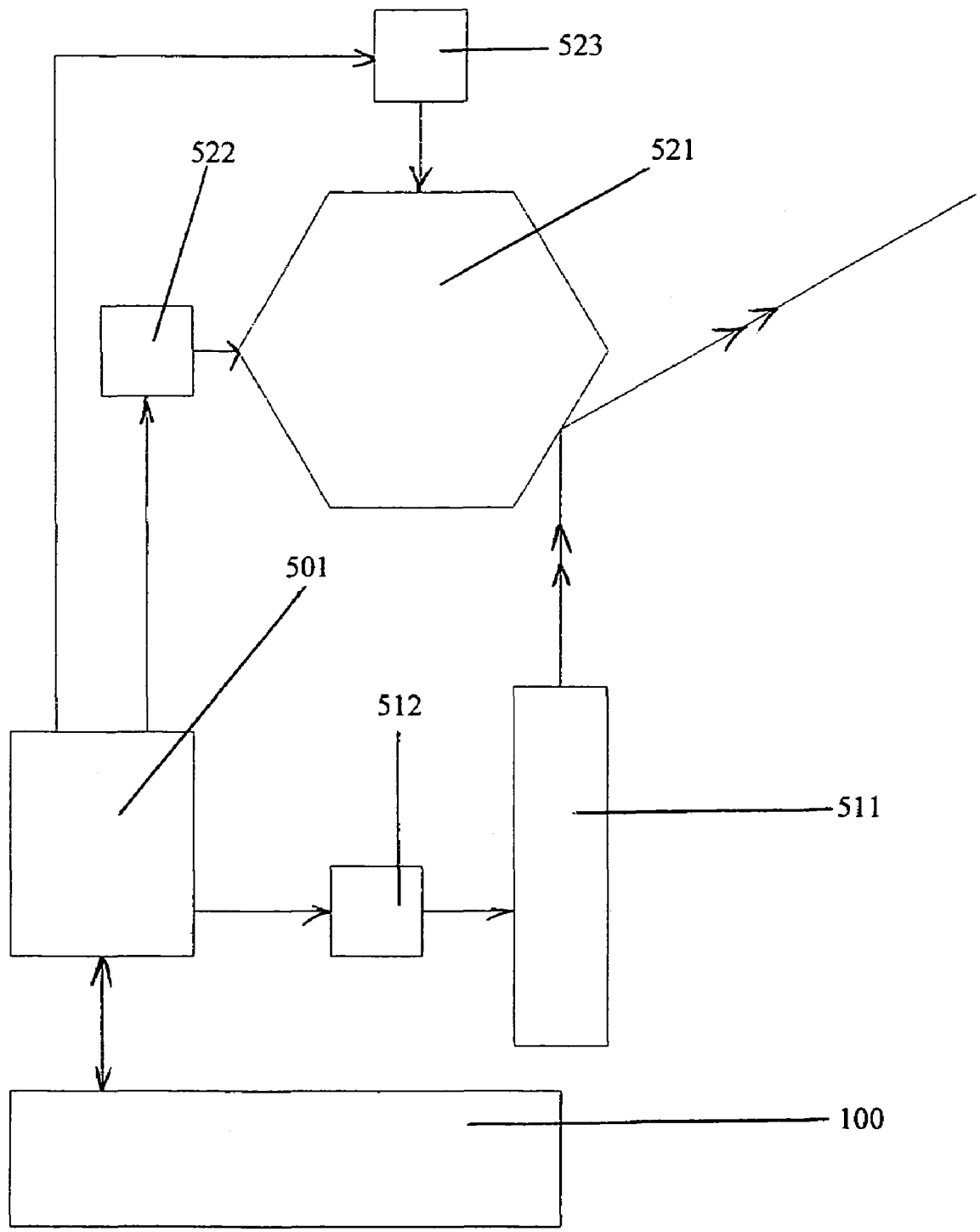
FIG. 6 is a representation of the working principle of the simultaneous laser targeting unit (SLTU).

FIG. 6 is a representation of the working principle of the SLTU 2. It operates similarly to the working principle of laser-printers, but it uses a different type of laser—one compatible with smart guiding systems—and the laser is oriented towards external targets. The laser is not used to discharge an electrostatically charged film, as in a laser printer. Instead, in the present invention, it transmits and projects an information package to the targets.

The SLTU controller 501 receives the targeting information from the computer 100. It controls the elevation and azimuth of the laser beam by tilting and rotating the mirror 521 with the help of the vertical and horizontal servo-motors 523 and 522.

The laser beam does not have to scan pixel by pixel the whole visual field, like a full page in printing. Instead, it can be oriented directly to the coordinates, one target after the other, repeatedly. There being no need for a full scan, it is possible to achieve a high repetition rate, making the marking of a plurality of targets virtually simultaneous. The 501 is sending the coded information to the laser control unit 512, which is commanding the laser gun 511.

Figure 7:
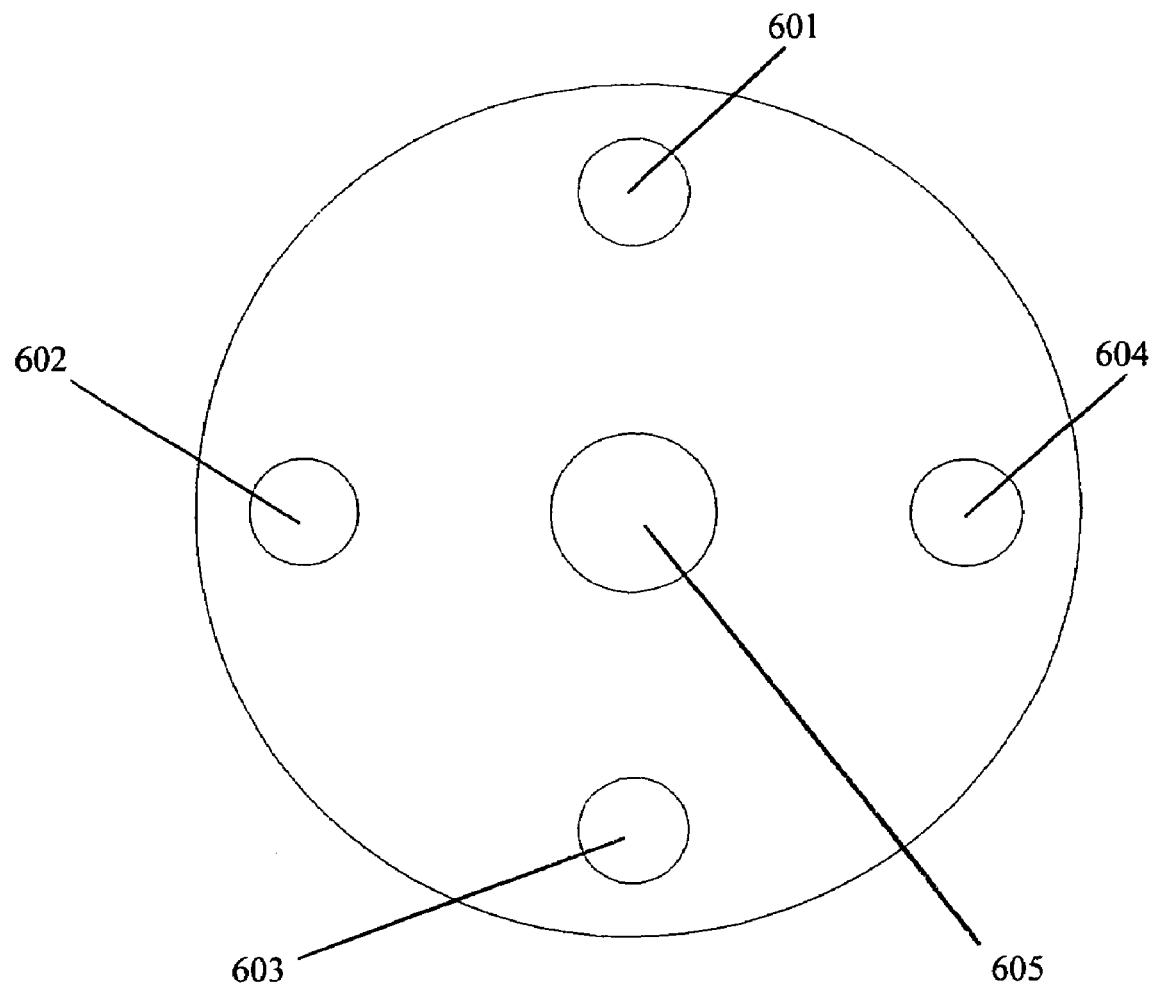
FIG. 7 is a representation of the sensor array of a processing unit.

FIG. 7 is a representation of the sensor array of a processing unit. The processing unit reads the reflected information with the selector sensor 605.

If there is a match, it aligns itself on the target and approaches it using the guide sensors 601, 602, 603 and 604. Otherwise, if there is no match, the processing unit searchs for another target, until it finds its own.

As military applications of the present invention include targeting systems, which can be improved considerably, from UAVs and anti-tank systems to ICBM defense, so called anti-rocket rocket systems, or the 'Star Wars' defense system.

This type of marking can also be used in non military applications, such as in a robotic production environment, internet surgery, unmanned vehicles or a multiple axis CNC machine.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

I claim:

1. A system for simultaneous marking and guiding for processing of one or more targeted objects comprising:
   a simultaneous marking means comprising
      a computer and process control means for command and control of marking and processing units, and
      an input means, having a human-machine interface for manual target and procedure selection, and
      an input-output means, having simultaneous discrete targeting equipment for visual inputs and physical marking of targeted objects comprising a simultaneous laser targeting unit and a video camera; and
   a discrete guiding means comprising
      a discrete decoder means, for reading and decoding discrete information reflected by a target and selection of a target by the processing unit, and
      a guiding means, for guiding the processing unit towards the selected target.

2. A system for simultaneous marking and guiding for processing of one or more targeted objects comprising:
   a simultaneous marking means comprising
      a computer and process control means for command and control of marking and processing units, and
      an input means, having a human-machine interface for manual target and procedure selection, and
      an input-output means, having a scanning area and a video camera, and simultaneous discrete targeting equipment for visual inputs and physical marking of targeted objects, wherein the scanning area is substantially identical to a visual field of the video camera and a display on the human-machine interface; and
   a discrete guiding means comprising
      a discrete decoder means, for reading and decoding discrete information reflected by a target and selection of a target by the processing unit, and
      a guiding means, for guiding the processing unit towards the selected target.

* * * * *